(12) United States Patent
Aiken et al.

(10) Patent No.: US 10,088,820 B2
(45) Date of Patent: Oct. 2, 2018

(54) OCCUPANCY BASED DEMAND CONTROLLED UTILITY SYSTEM

(71) Applicants: Thomas David Aiken, Basking Ridge, NJ (US); Michael Eugene Williams, Lafayette, CO (US)

(72) Inventors: Thomas David Aiken, Basking Ridge, NJ (US); Michael Eugene Williams, Lafayette, CO (US)

( * ) Notice: Subject to any disclaimer, the term of this patent is extended or adjusted under 35 U.S.C. 154(b) by 366 days.

(21) Appl. No.: 15/003,290

(22) Filed: Jan. 21, 2016

(65) Prior Publication Data

US 2016/0139576 A1   May 19, 2016

Related U.S. Application Data

(63) Continuation-in-part of application No. 12/591,803, filed on Dec. 2, 2009, now Pat. No. 9,528,715.

(51) Int. Cl.
*G05B 15/02* (2006.01)
*H05B 37/02* (2006.01)
(Continued)

(52) U.S. Cl.
CPC .......... *G05B 15/02* (2013.01); *F24F 11/0001* (2013.01); *F24F 11/30* (2018.01);
(Continued)

(58) Field of Classification Search
None
See application file for complete search history.

(56) References Cited

U.S. PATENT DOCUMENTS 5,156,203 A    10/1992  Funakoshi et al.
6,348,867 B1    2/2002  Myllymaki
(Continued)

OTHER PUBLICATIONS

Promising Technology: Wireless Lighting Occupancy Sensors, Department of Energy, Office of Energy Efficiency & Renewable Energy, http://www.energy.gov/eere/femp/promising-technology-wireless-lighting-occupancy-sensors, Jan. 4, 2016.
(Continued)

*Primary Examiner* — Kenneth M Lo
*Assistant Examiner* — Istiaque Ahmed
(74) *Attorney, Agent, or Firm* — Lerner, David, Littenberg, Krumholz & Mentlik, LLP (57) ABSTRACT

To control lighting and other utilities in buildings based upon occupancy, mountable sensors are used to detect low energy radio frequencies emitted from devices, or tags, worn or carried by occupants. In a demand control system, identification (ID) codes embedded in tags worn by occupants are detected in each room by a tag sensor and may wirelessly communicate to a zonal compiler that determines zonal occupancy. The zonal occupancy count is transmitted to an interface relay that immediately adjusts the intensity and rate of the specific utility. HVAC systems may also be tied into the system to have adjustments made to the intensity and rate of ventilation as done with the lighting in this system. This system has many advantages over current systems such as not being dependent upon movement of an occupant or following the heat signature of an occupant that both may lead to false readings and delay in adjusting the specific building utility to save energy and costs.

17 Claims, 8 Drawing Sheets

(51) Int. Cl.
*F24F 11/00* (2018.01)
*F24F 11/30* (2018.01)
*F24F 11/62* (2018.01)
*H04W 4/80* (2018.01)
*F24F 120/10* (2018.01)

(52) U.S. Cl.
CPC ............... *F24F 11/62* (2018.01); *H04W 4/80* (2018.02); *H05B 37/0227* (2013.01); *H05B 37/0272* (2013.01); *F24F 2120/10* (2018.01); *Y02D 70/00* (2018.01); *Y02D 70/142* (2018.01); *Y02D 70/144* (2018.01); *Y02D 70/166* (2018.01); *Y02D 70/26* (2018.01)

(56) References Cited

U.S. PATENT DOCUMENTS

| | | | |
|---|---|---|---|
| 6,916,239 | B2 | 7/2005 | Siddaramanna et al. |
| 6,927,687 | B2 | 8/2005 | Carrender |
| 6,988,071 | B1 | 1/2006 | Gazdzinski |
| 7,511,613 | B2 | 3/2009 | Wang |
| 7,545,267 | B2 | 6/2009 | Stortoni |
| 7,948,189 | B2 | 5/2011 | Ahmed |
| 8,909,382 | B1 | 12/2014 | Malakuti |
| 2006/0022801 | A1* | 2/2006 | Husak ................. G06K 7/0008 340/10.5 |
| 2007/0149109 | A1* | 6/2007 | Gu .......................... F24F 11/30 454/256 |
| 2008/0048826 | A1 | 2/2008 | Agrawal et al. |
| 2008/0076346 | A1 | 3/2008 | Ahmed |
| 2012/0161645 | A1* | 6/2012 | Dingemans ........ H05B 37/0218 315/153 |

OTHER PUBLICATIONS

SPEED, State Partnership for Energy Efficient Demonstrations, Adaptive Corridor Lighting, University of California, San Francisco, Apr. 2014.
Brons, Jennifer, Field Test Delta, T5 Fluorescent High-Bay Luminaires and Wireless Lighting Controls, Lighting Research Center, Issue 3, Rensselaer Polytechnic Instutute, Dec. 2008.
Wei, J.; Rubinstein, F., et al., Wireless Advanced Lighting Controls Retrofit Demonstration, Lawrence Berkeley National Laboratory, Apr. 2015.
EOPC-100 Wireless RF PIR Occupancy Sensor, WattStopper, Pub. No. 39201, Aug. 2013.
Thermokon, Sensortechnik GmbH, SR-MDS, Wireless Ceiling Multi Sensor 360°, 2010.
DT-300 Series Low Voltage Dual Technology Ceiling Sensors, WattStopper, Pub. No. 14909, May 2013.

* cited by examiner

OCCUPANCY BASED DEMAND CONTROLLED UTILITY SYSTEM

CROSS-REFERENCE TO RELATED APPLICATION(S)

The present application is a Continuation-in-Part of U.S. patent application Ser. No. 12/591,803, filed on Dec. 2, 2009, the disclosure of which is incorporated herein by reference.

FIELD OF INVENTION

The present invention relates to the field of controlling utility services and, more particularly, to the field of electrical lighting for buildings. HVAC and, more particularly, ventilation systems for buildings may also utilize the invention. The present invention specifically addresses demand-controlled systems, in which the rate of utility use is determined based on actual occupancy levels in the controlled zones, rather than default occupancy levels.

BACKGROUND

Both environmental and economic concerns in recent years have driven a move toward conserving energy in building utilities such as lighting and heating, ventilation and air conditioning (HVAC). Various methods have been used in the past to conserve energy in these service utility areas and have been met with limited success. For example, ASHRAE (American Society of Heating, Refrigerating and Air Conditioning Engineers) ventilation standards now provide algorithms for adjusting ventilation rates based on occupancy in order to reduce energy consumption when demand falls below default levels. Systems have been developed that estimate occupancy based on levels of carbon dioxide measured in the ventilated space. But these carbon dioxide based systems have several disadvantages, including the reliability and accuracy of the carbon dioxide monitors and the costs associated with installing and maintaining them.

In addition, some systems use radio frequency identification (RFID) tags to monitor occupancy of a zone and others use active RFID tags to set different parameters of an HVAC system directly, in accordance with the needs of the person or product to which the tag is attached. But none of the systems has the capability of automatically and immediately adjusting light intensity and/or ventilation rates based on accurate occupancy levels.

The patent issued to Stortoni, U.S. Pat. No. 7,545,267, discloses a system in which RFID tags attached to climate-sensitive products signal a transponder in the storage area, which transponder signals one or more building control systems (such as HVAC) to adjust to the product's optimal environment. This system is not designed to address occupancy-based demand-controlled ventilation (DCV) and is not adaptable to that purpose. The Stortoni system requires expensive and bulky active RFID tags having substantial internal data content which serve no purpose in the DCV context.

The patent of Carrender, U.S. Pat. No. 6,927,687, discloses an apparatus that uses RFID tags and readers to monitor environmental conditions in a given area. The functions of this apparatus are unrelated to determining occupancy and/or controlling area ventilation rates.

The patent to Gazdzinski, U.S. Pat. No. 6,988,071, describes a "smart elevator" system that keeps track of occupancy levels in elevator car and/or destination floors by detecting RFID tags carried by passengers. While there is an embodiment of this system that involves control of HVAC in areas of the destination floor, this control is exercised by the elevator passenger manually activating a key pad or touch screen within the elevator. Therefore, the function of automatically setting ventilation levels in areas based on RFID-detected occupancy is not addressed.

The patent application of Agrawal, et al., US 2008/0048826, involves a system that uses an RFID badge to track an occupant's movement through an area and automatically disable certain hazards in the occupant's path for safety purposes. No means of counting occupants in the area or using that data to control ventilation rates is disclosed.

The patent issued to Myllymaki, U.S. Pat. No. 6,348,867, is a system that automates building control systems in accordance with an occupant's physiological condition as monitored by a wrist-held sensor. Occupancy-based DCV is not an object of this invention.

The patent of Funakoshi, et al., U.S. Pat. No. 5,156,203, discloses an air conditioning system that adjusts itself in response to preferred settings recorded on a "smart" ID card carried by the occupant. While automatic HVAC control is featured, it is not demand-controlled based on an occupancy count.

Using alternative sensing technologies—passive infrared (PR), acoustic (micro-phonics) or ultrasonic (Doppler microwave)—means occupants must keep moving or generating sound in order to be detected. Importantly, these types of sensors call for a delay in shutting off lights after no motion or sound is detected, in case occupants are still present. It becomes a nuisance if occupants are still present and the lights go off, and the delay itself, typically 20 minutes, causes unnecessary energy consumption if the space is indeed vacant. Reducing shut off delay from 20 minutes to ten or five minutes represents significant energy savings. In an attempt to compensate for the disadvantages of dependency on sound or movement, manufacturers are now combining technologies in their platforms such as PIR/Acoustic. Known as Passive Dual Technology, PDT, dual sensors carry added cost. When lights turn off, due to lack of motion or sound, occupants that are still present must move or make sounds to turn the lights back on. Such off/on energy consumption is expensive and can shorten the life of bulbs and switches.

SUMMARY OF THE INVENTION

One objective of the present invention is to control utilities in buildings based upon occupancy as determined by mountable sensors that detect low energy radio frequencies (such as BLUETOOTH) or other wireless signals from devices, or tags, worn or carried by occupants.

Use of wearable beacons or tags provides granular, real time occupancy data. Energy savings come from turning out the lights immediately upon vacancy. Using alternative sensing technologies—passive infrared (PIR), acoustic (micro-phonics) or ultrasonic (Doppler microwave)—means occupants must keep moving or generating sound in order to be detected. Importantly, these types of sensors call for a delay in shutting off lights after no motion or sound is detected, in case occupants are still present. It becomes a nuisance if occupants are still present and the lights go off, and the delay itself, typically 20 minutes, causes unnecessary energy consumption if the space is indeed vacant. Reducing shut off delay from 20 minutes to ten or five minutes represents significant energy savings.

Significantly, for the present invention if the beacons, tags or other devices contain the identification (ID) code are not worn or carried, people will not be detected and the system will not adjust the building utilities according to the present invention.

The present invention proposes an alternate method of determining the occupancy level of a controlled zone or space by monitoring ingress into and egress from the space or individual rooms within the space. Active or passive identification tags incorporated in identification badges worn by building occupants are used to count the actual number of occupants of a given space, and that occupancy information is then relayed to a microprocessor-based control unit. A control unit or microprocessor is interfaced with the building's utilities such as lighting and HVAC (heating, ventilating and air conditioning) systems so as to adjust the lighting and ventilation rates in each zone or room or rooms in accordance with the computed occupancy-based demand. For HVAC, the control unit will apply the relevant ASHRAE algorithm to compute the required ventilation rate. Lighting may be adjusted individually or in conjunction with other utilities such as HVAC. Adjustments may include, for example, adjustments to intensity, rate, on/off control, dimming control, fan speed, temperature control, and the like.

The present invention bridges a gap in current state of the art systems by providing a process by which tagged ID badges are detected in each room by a tag sensor. The tag IDs are wirelessly communicated to a zonal compiler that determines a zonal occupancy. The zonal occupancy count arrived at by the zonal compiler is wirelessly transmitted to the utility microprocessor, which computes utility demand and interfaces with the building's utility services. Utility services include lighting and HVAC systems. Zonal and room lighting and ventilation rates and intensity based on the occupancy count or not so based and applicable ASHRAE and IESNA (Illuminating Engineering Society of North America) standards may be utilized to control the building's utility functions. Depending on the embodiment the lighting utility may not require a complier and function from activation of the tag or device in the possession of an occupant.

Using wearable beacons or tags gives granular, real time occupancy information. Energy savings come from turning out the lights for example immediately upon vacancy. Devices such as tags may be worn or carried by the occupant whose presence is determined by the identification code embedded within the tag or device.

From a process standpoint, the present invention comprises the following steps:

1. Assigning a wearable identification (ID)-coded passive or active tag to each building occupant and visitor;

2. Providing in each room a tag sensor that detects each occupant tag within the room and causes the ID-code associated with each detected tag to be wirelessly transmitted to a zonal occupancy compiler or microprocessor, either by the sensor itself, in the case of passive tags, or by the tag itself, if it is an active tag;

3. Providing in each control zone, whether it is a ventilation zone or a lighting zone or both, of the building a zonal occupancy compiler or microprocessor, which receives the ID-code transmission from the tag sensors of all rooms within the zone, or individual selected rooms as desired, and next, after discounting redundant ID-codes, computes or determines an occupancy count for the zone and/or room or group of rooms, and then transmits the zonal occupancy count to the utility microprocessor; and 4. The microprocessor that receives the zonal occupancy count from each zone in the building and, depending on the type of use in the zone, computes a ventilation rate, or lighting intensity rate or various other utility parameters such as on/off, amount of luminescence, lighting intensity, wattage and/or amperage usage, color of lighting, quantity of lighting, and other parameters for the zone, and then implements the specific parameter or parameters such as ventilation rate for HVAC through an interface relay with the specific controls of the building's utility system.

To minimize cost and bulk, the occupant tags are preferably passive tags or active tags with limited data storage. Most conveniently, the tags would be incorporated in badges worn by all building occupants. Each tag would have a remotely-scannable/transmittable identification code. People working in the building would be assigned a permanent badge with their own ID code, while visitors would receive ID-coded badges upon checking in with building security. ID-codes enable the system to avoid multiple counting of one individual as he/she moves from one room to another.

While the tag sensors located in each room may use either infrared (IR) or RFID detection, the system can utilize any form of wireless communication between the tag sensors and the ID-coded badges, including Wi-Fi, BLUETOOTH, optical and/or laser signals. Depending on the size and configuration of the room, multiple tag sensors can be deployed if needed. Preferably, the tag sensors can be focused to avoid detection of tags outside the assigned room. One or more rooms are grouped together in zones corresponding to a common ventilation sub-system. In each zone, the zonal occupancy compiler communicates wirelessly with each of the passive tag sensors or active tags, preferably by radio frequency (RF) signal, but alternately by IR, Wi-Fi, optical and/or laser signals.

Consequently, the present invention affords significant energy efficiencies not enabled by the prior art in this field. Moreover, this system is relatively inexpensive and simple to implement, unlike systems requiring carbon dioxide ($CO_2$) monitoring and/or sophisticated active tags.

Having described the general concepts of the present invention, it is understood that the invention may be realized in a number of possible embodiments. While some of these embodiments have been selected to illustrate in more concrete form how this invention may be practiced, it is understood that the following detailed description is presented for exemplary purposes only and does not limit the scope of the present invention or the claims made in relation thereto.

DETAILED DESCRIPTION

Figure 1:
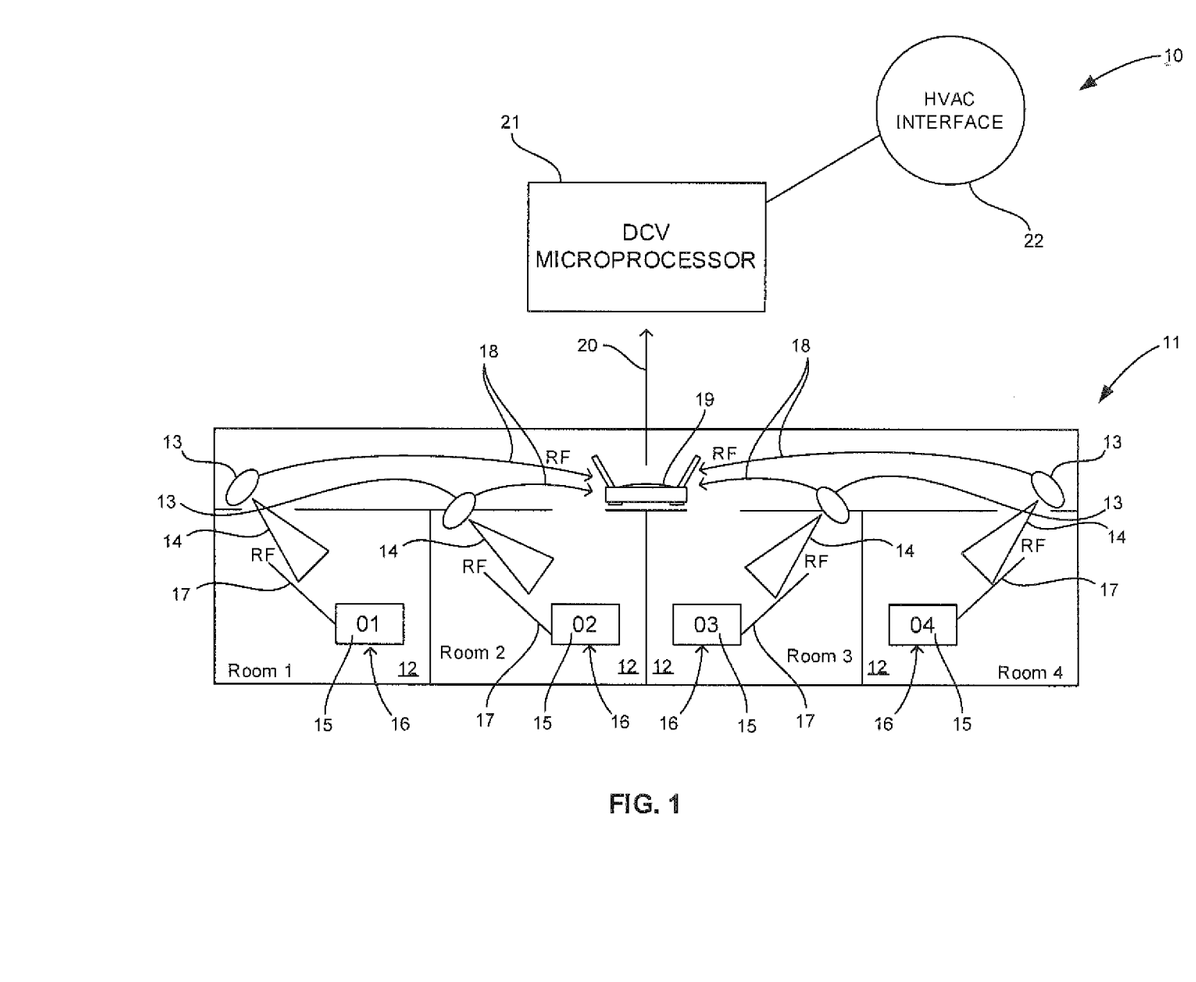
FIG. 1 is an illustration of an HVAC control arrangement using the passive tag embodiment of the present invention.

As an illustrative example, referring to FIG. 1, consider a ventilation zone comprising four offices, designated Rooms 1-4. Each room has one occupant, each of whom wears a badge with a passive RFID tag. The four tags are assigned ID codes 01-04. At 9 a.m., each occupant is in his/her own office, and his/her tag is detected by a tag reader in that office. The zonal compiler receives from the four tag readers four ID codes, one per room, and establishes an occupancy count of four for the zone. At 10 a.m., occupant 01 briefly leaves Room 1, hands a memo to occupant 02 in Room 2, then returns to his/her own office. When the compiler receives from the tag reader of Room 2 a detection of two tags, it compares the ID codes with those previously counted and eliminates the redundant count for occupant 01, thereby maintaining the correct total occupancy count of four.

At designated intervals, the zonal occupancy compiler sends its occupancy count to the central DCV microprocessor. The DCV microprocessor takes the occupancy count for each zone and applies the appropriate algorithm based on the current ASHRAE standard or other relevant HVAC codes. Revisiting our illustrative office example, let's say that at 11 a.m. each of the four occupants has one visitor, each wearing an ID badge. Four employee ID codes and four visitor ID codes will be detected by the tag readers in Rooms 1-4, and the occupancy compiler will generate a count of eight occupants for the zone.

The DCV microprocessor would then apply the current ASHRAE ventilation standard 62.1, based on the following algorithm:

$$V_{bz}=(R_p \times P_z)+(R_a \times A_z)$$

Where:

$V_{bz}$=breathing-zone ventilation rate, in cubic feet per minute (cfm)

$R_p$=required outdoor airflow rate per person, in cfm $P_z$=zone population, in number of occupants $R_a$=required outdoor airflow rate per unit floor area, in cfm per square foot (cfm/sf)

$A_z$=zone floor area, in square feet (sf)

From Table 6.1 of the ASHRAE standard, the required occupancy airflow rate Rp for office use is 5 cfm per person, while the required floor area airflow rate Ra for office space is 0.06 cfm/sf. Therefore, in our example, if the area of each of the four offices is 1000 sf, the DCV microprocessor will compute the ventilation rate $V_{bz}$ as follows:

$$V_{bz}(5 \times 8)+(0.06 \times 4000)40+240=280 \text{ cfm}$$

The required ventilation rate of 280 cfm is then implemented for the zone in question through an interface between the DCV microprocessor and the building HVAC system controller.

It's noteworthy that, in the absence of such occupancy-based demand-controlled ventilation adjustments, the ventilation rate would be set, under ASHRAE standards, by a default occupancy rate, which for offices is five persons per 1000 square feet. So in our example, the default occupancy would be twenty persons, which would result in a ventilation rate of 340 cfm, an increase of over 20% over the occupancy-based ventilation rate. The difference is even greater if we consider a situation, let's say during lunchtime, when only two of the four occupants are in their offices. The occupancy-based DCV ventilation rate would then be only 250 cfm, and the default rate of 340 cfm would be 36% greater.

FIG. 1 depicts a schematic apparatus configuration of the first embodiment of the present invention 10, which uses passive tags. For illustrative purposes, this figure focuses on one ventilation zone 11 of a building that has multiple ventilation zones. The same basic apparatus configuration would be replicated in the other ventilation zones of the building. The exemplary ventilation zone 11 comprises four rooms 12, which are labeled Rooms 1-4. Obviously, depending on the floor plan and ventilation system of the building, each ventilation zone 11 can have more or fewer rooms 12 than are depicted in this figure. Hence, the number of rooms 12 indicated here is for illustrative purposes only.

In each room 12, there are one or more sensors that are tag readers 13. There is one tag reader 13 per room 12, but multiple tag readers 13 may be required for rooms that are very large and/or have very complex configurations. In the preferred embodiment 10, the tag reader(s) 13 in each room 12 continuously transmit(s) RF search signals 14 throughout the room 12. The search signals 14 are detected by passive RFID tags 15 implanted in ID badges 16 issued to all building occupants and visitors. The RFID tags 15 respond to the search signals 14 by transmitting RF tag signals 17 back to the tag reader 13. The tag signal 17 for each RFID tag 15 transmits a digital ID code assigned to the particular ID badge 16 in which the RFID tag 15 is implanted. The tag reader(s) 13 then compile a running list of ID codes associated with the RFID tags 15 that are present in the room 12.

The tag reader(s) 13 in each room 12 at specified intervals transmit(s) RF reader signal(s) 18 to a zonal compiler 19 that is assigned to the ventilation zone 11 in which the room 12 is located. Each reader signal 18 transmits two digital codes: first, a room code uniquely identifying the room 12 in which the tag reader 13 is located, and second, the ID code of each RFID tags 15 detected in that room 12 during that interval. Using this data, the zonal compiler 19 registers a zonal occupancy count based on the number of ID codes received, discounting redundant ID codes. The zonal compiler 19 then transmits the zonal occupancy counts digitally via an RF compiler signal 20 sent to a central demand control ventilation (DCV) microprocessor 21. The DCV microprocessor 21 wirelessly interfaces with the zonal compilers 19 of all the ventilation zones 11 within the building.

Using the zonal occupancy count received from each zonal compiler 19, the DCV microprocessor 21 computes the demand ventilation rate based on the applicable ASHRAE algorithms and standards for the use(s) associated each ventilation zone 11. The DCV microprocessor 21 then relays or transmits the computed ventilation rate to an HVAC interface 22, which interfaces with the building HVAC system so as to implement the demand ventilation rate.

Figure 2:
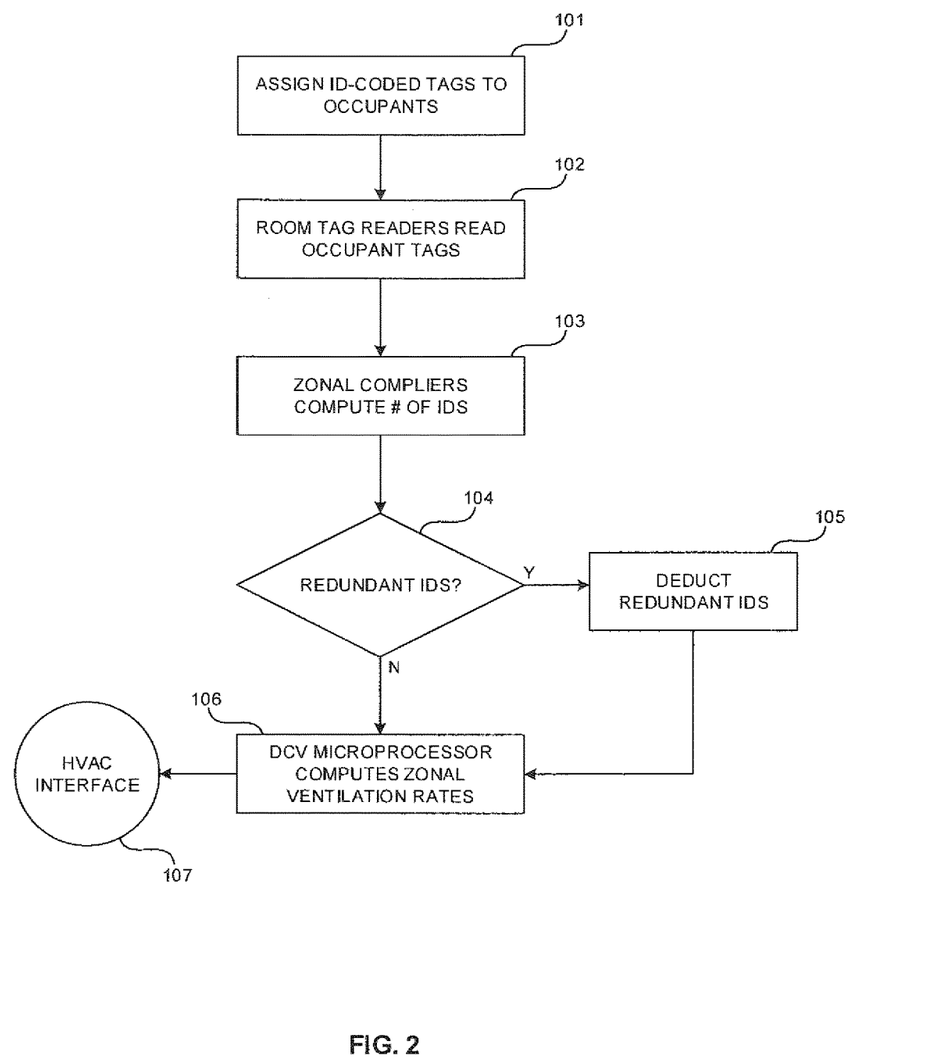
FIG. 2 is a flow-chart of the process of the passive tag embodiment of the present invention.

Referring to FIG. 2, the process of the first embodiment of the present invention 10 is described by means of a flow chart. The process comprises the following steps:

101: Assigning to each building occupant and visitor a wearable ID badge 16 containing an ID-coded passive RFID tag 15;

102: Providing in each room 12 a tag reader 13 that detects each occupant's RFID tag 15 within the room 12 and wirelessly transmits the ID-code associate with each detected tag 15 to a zonal compiler 19;

103: Providing in each ventilation zone 11 of the building a zonal compiler 19, which receives the ID-code transmissions 18 from the tag readers 13 of all rooms 12 within the zone 11, and next, after discounting redundant ID-codes (104-105) computes an occupancy count for the zone, and then transmits the zonal occupancy count to a central DCV microprocessor 21; and 106: Providing a central DCV microprocessor 21 that receives the zonal occupancy count from each ventilation zone 11 in the building and, depending on the type of use in the zone, computes a ventilation rate for the zone, and then implements that ventilation rate (107) through an interface 22 with the ventilation rate controls of the building HVAC system.

Figure 3:
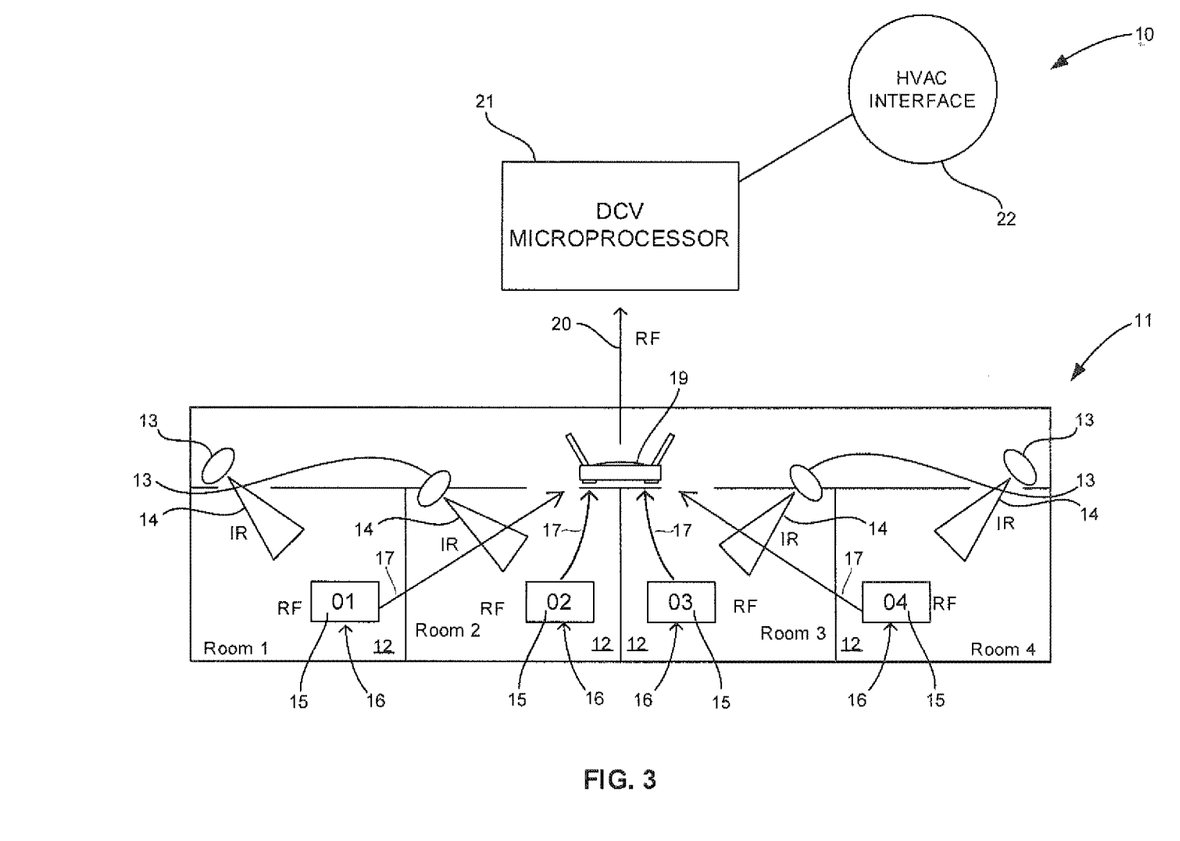
FIG. 3 is an illustration of an HVAC control arrangement using the active tag embodiment of the present invention.

FIG. 3 depicts a schematic apparatus configuration of the second embodiment of the present invention 10, which uses active tags. For illustrative purposes, this figure focuses on one ventilation zone 11 of a building that has multiple ventilation zones. The same basic apparatus configuration would be replicated in the other ventilation zones of the building. The exemplary ventilation zone 11 comprises four rooms 12, which are labeled Rooms 1-4. Obviously, depending on the floor plan and ventilation system of the building, each ventilation zone 11 can have more or fewer rooms 12 than are depicted in this figure. Hence, the number of rooms 12 indicated here is for illustrative purposes only.

In each room 12, there are one or more sensors that are infra-red (IR) emitters 13. There is one IR emitter 13 per room 12, but multiple IR emitters 13 may be required for rooms that are very large and/or have very complex configurations. In the embodiment 10, the IR emitter(s) 13 in each room 12 continuously emit(s) IR search signals 14 throughout the room 12.

The IR search signals 14 include a controlled space code identifying the particular room 12 in which the source IR emitter 13 is located. The IR search signals 14 are received by active RFID tags 15 implanted in ID badges 16 issued to all building occupants and visitors. The RFID tags 15 respond to the IR search signals 14 by transmitting RF tag signals 17 to a zonal compiler 19. The tag signal 17 for each RFID tag 15 transmits a digital ID code assigned to the particular ID badge 16 in which the RFID tag 15 is implanted, as well as the controlled space code received via the IR search signals 14, which identifies the room 12 in which the tag 15 has been detected.

The RFID tags 15 each room 12 continuously transmit tag signals 17 to a zonal compiler 19 that is assigned to the ventilation zone 11 in which the room 12 is located. Each tag signal 17 transmits two digital codes: first, a controlled space code uniquely identifying the room 12 in which the tag 15 is located, and second, the ID code of the tag 15 itself. Using this data, the zonal compiler 19 registers a zonal occupancy count based on the number of ID codes received, discounting redundant ID codes. The zonal compiler 19 then transmits the zonal occupancy counts digitally via an RF compiler signal 20 sent to a central demand control ventilation (DCV) microprocessor 21. The DCV microprocessor 21 wirelessly interfaces with the zonal compilers 19 of all the ventilation zones 11 within the building.

Using the zonal occupancy count received from each zonal compiler 19, the DCV microprocessor 21 computes the demand ventilation rate based on the applicable ASHRAE algorithms and standards for the use(s) associated each ventilation zone 11. The DCV microprocessor 21 then relays or transmits the computed ventilation rate to an HVAC interface 22, which interfaces with the building HVAC system so as to implement the demand ventilation rate.

Figure 4:
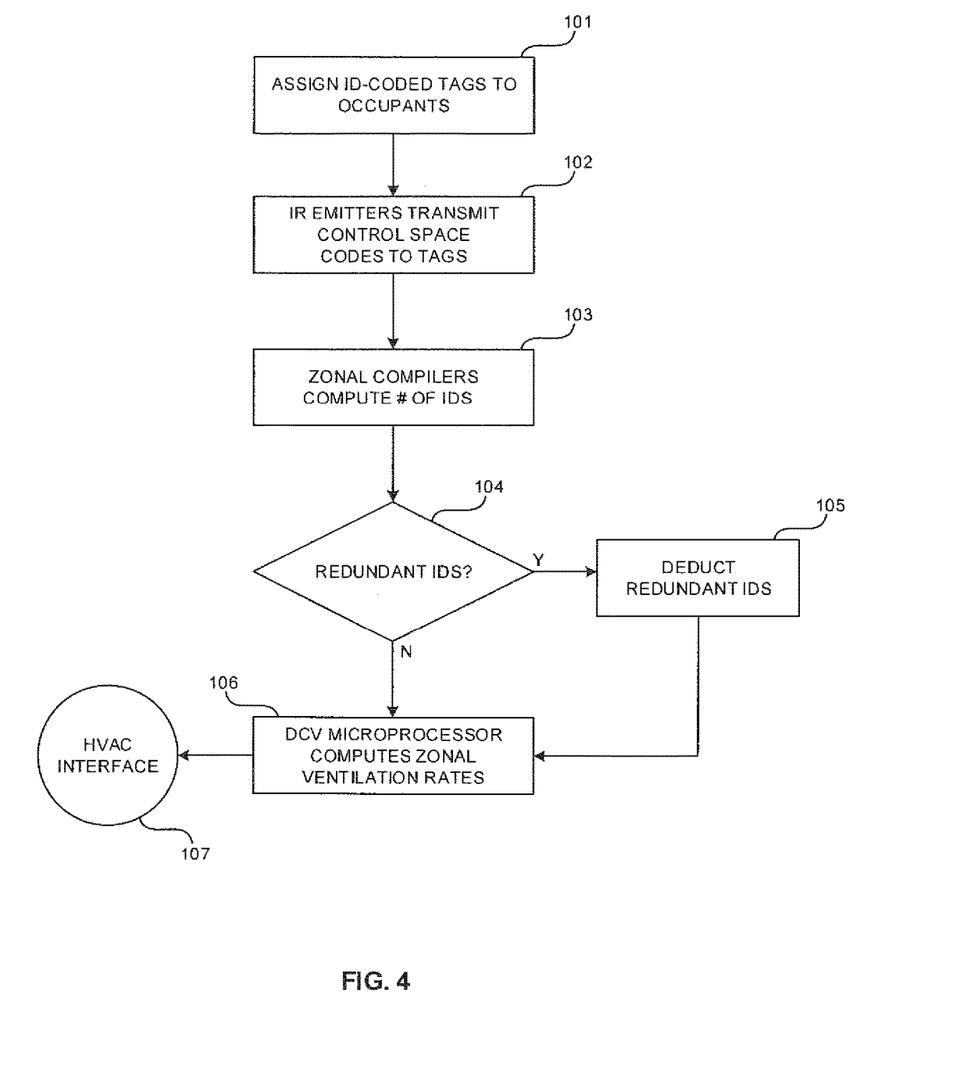
FIG. 4 is a flow-chart of the process of the active tag embodiment of the present invention.

Referring to FIG. 4, the process of the second embodiment of the present invention 10 is described by means of a flow chart. The process comprises the following steps:

101: Assigning to each building occupant and visitor a wearable ID badge 16 containing an ID-coded active RFID tag 15;

102: Providing in each room 12 an IR emitter 13 that detects each occupant's RFID tag 15 within the room 12 and wirelessly transmits to each tag 15 the controlled space code associated with the room 12 in which the tag 15 has been detected;

103: Providing in each ventilation zone 11 of the building a zonal compiler 19, which receives from each of the tags 15 in all rooms 12 within the zone 11 a continuous wireless transmission containing both the ID code of each tag 15 and the controlled space code for the room in which the tag 15 has been detected;

104-105: After discounting redundant ID-codes, the zonal compiler 19 computes an occupancy count for the zone, and then transmits the zonal occupancy count to a central DCV microprocessor 21; and 106: Providing a central DCV microprocessor 21 that the zonal occupancy count from each ventilation zone 11 in the building and, depending on the type of use in the zone, computes a ventilation rate for the zone, and then implements that ventilation rate (107) through an interface 22 with the ventilation rate controls of the building HVAC system.

Figure 5:
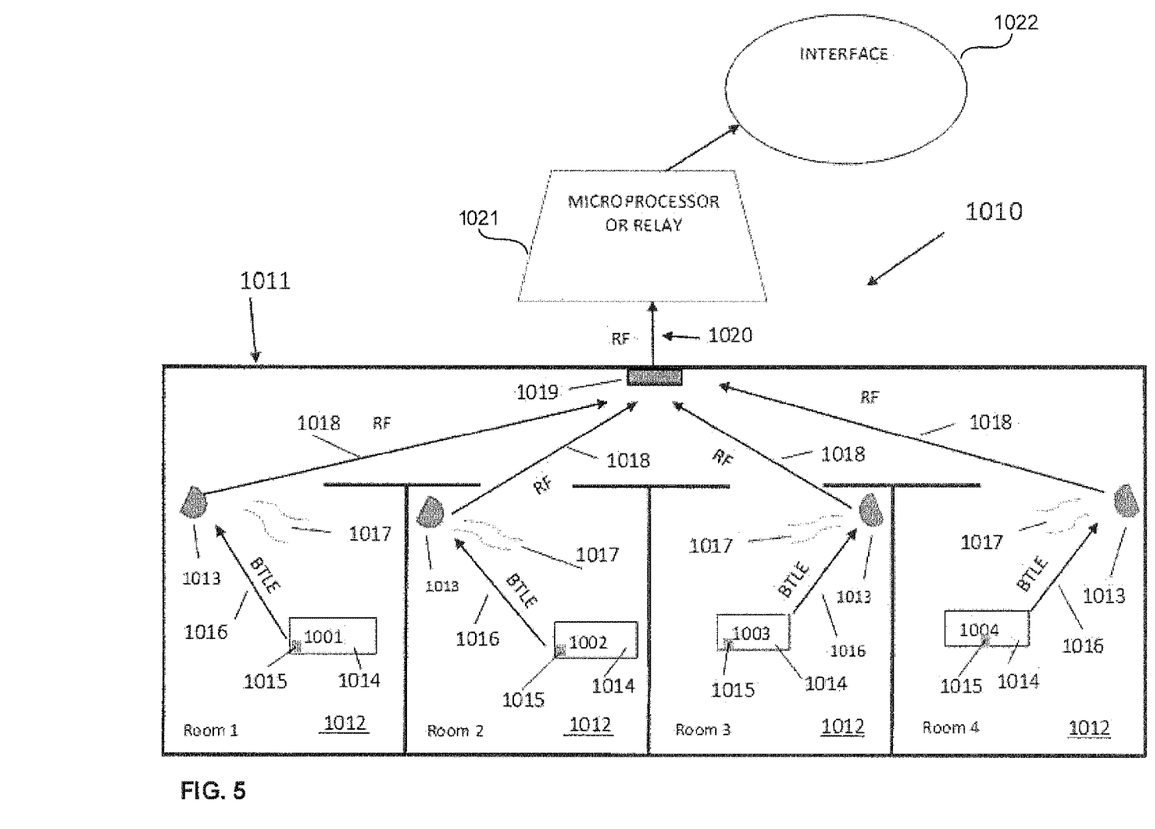
FIG. 5 is an illustration of a utility control arrangement using the present invention where the utility may be lighting, HVAC or both.

Depicted in FIG. 5, system 1010, in a controlled zone 1011 there are tags 1015 attached to employee badges 1014. The tags 1015 emit radio frequency 1016, (such as, but not limited to, BLUETOOTH low energy, BTLE), to mounted sensors 1013 in each room 1012. Sensor 1013 is BLUETOOTH-enabled and will emit a search signal 1017 for any tags in its assigned space 1012. Sensors 1013 communicate wirelessly 1018 the location of tags 1015 to a lighting zonal compiler 1019 that takes signals from sensors 1013 in its assigned space 1011. The zonal compiler 1019 communicates wirelessly 1020 with the lighting and/or HVAC microprocessor or switch 1021. An optional interface 1022 may be used instead of microprocessor or switch 1021 to interface with the utility of interest and adjust or turn on/off the power to the utility such as the lighting and/or ventilation system.

Depending on the embodiment the sensor may communicate directly to the switch or interface to control the utility such as the lighting. Furthermore, it is within the scope of this invention that the lighting may not require a zonal compiler and may not require to be dependent upon occupancy count. It is further within the scope of this invention that the HVAC may depend on occupancy count. In any event both the HVAC and lighting utilities require that the occupants wear or carry tags or other devices that emits a signal that contains identification (ID) code and the tag signal controls the utility, specifically to go off and/or on, and depending on the embodiment adjust the rate and intensity of the utility. Furthermore, depending on the embodiment, the sensor may be attached to each light in the room or controlled zone, and/or there may be multiple sensors in the room controlling the light fixtures either individually or jointly within the room or throughout the controlled zone. In addition depending on the embodiment, lights either in the room or rooms within the control zone may go off and on as the occupant passes the light fixture or individually or jointly stay on until the occupant leaves the room or control zone. This embodiment also may apply to HVAC where ventilation may go on/off in stages within a room or controlled zone such as, but not limited to zone heating. Furthermore, lighting may be adjusted by the sensor based on already available ambient lighting and/or heating. In the situation where multiple occupants are in a room, body heat will be generated more than if a single occupant is in the room so heating may be adjusted accordingly. In the lighting utility setting, ambient light may be already available due to window access and lighting may be adjusted accordingly. Furthermore as more occupants enter the room or control zone, intensity or amount of the lighting may be altered as indicated by the amount of occupants in the room or controlled zone wearing or having the tags. For example a single occupant may be in one corner of a room and only require that corner to be lighted. As more occupants enter the room and occupy more areas of the room, more light may be required throughout the room. Intensity may be altered based on the already available utility of interest and the amount of occupants in the room or controlled zone.

The tags depending on the embodiment may emit a radio frequency selected from the group consisting of BLUETOOTH low energy, extremely low frequency RF 3-30 Hz, super low frequency RF 30-300 Hz, ultra-low frequency RF 300-3000 HZ, microwave, and any combination thereof.

For purposes of this description, the terms "beacon or beacons" include low energy BLUETOOTH RF, RFID, Wi-Fi or other wireless protocol emitters. Each beacon carries a unique identification (ID) code and is to be worn or carried by a building occupant or visitor during occupancy hours.

The terms "sensor or sensors" include electronic devices enabled to receive wireless signals that detect the presence of a signal in a defined controlled zone and that communicate wirelessly the presence of identifiable signals to a lighting or other control microprocessor. The sensor will also be able to communicate to a secure cloud or other data storage for data logging.

Wearable beacons or tags emit a low energy, wireless signal, such as BLUETOOTH, that can be detected by electronic sensors enabled for those signals. For commercial and government organizations that require employee or visitor badges be worn at all times, these beacons can be affixed to the badge and worn while in buildings. Detection of beacons then provides occupancy data in real time. Sensors mounted in zones or areas of utilities control, such as for HVAC and lighting, can determine if occupants are in the zone and send notifications to the appropriate control mechanisms for those systems. Demand for lighting could be a simple signal to the lighting microcontroller: "Occupied" when beacons are detected and "Vacated" when beacons are not detected. Consequently, demand for lighting is met in real time, thus minimizing wasted electricity. Depending on the embodiment, the lighting microcontroller may interface with a single luminaire or a series of luminaires.

For organizations that do not require badges, wearable beacons may be issued for the sake of employee contribution to environmental conservation. It is preferred that all occupants carry or wear a beacon for optimal performance.

Figure 6:
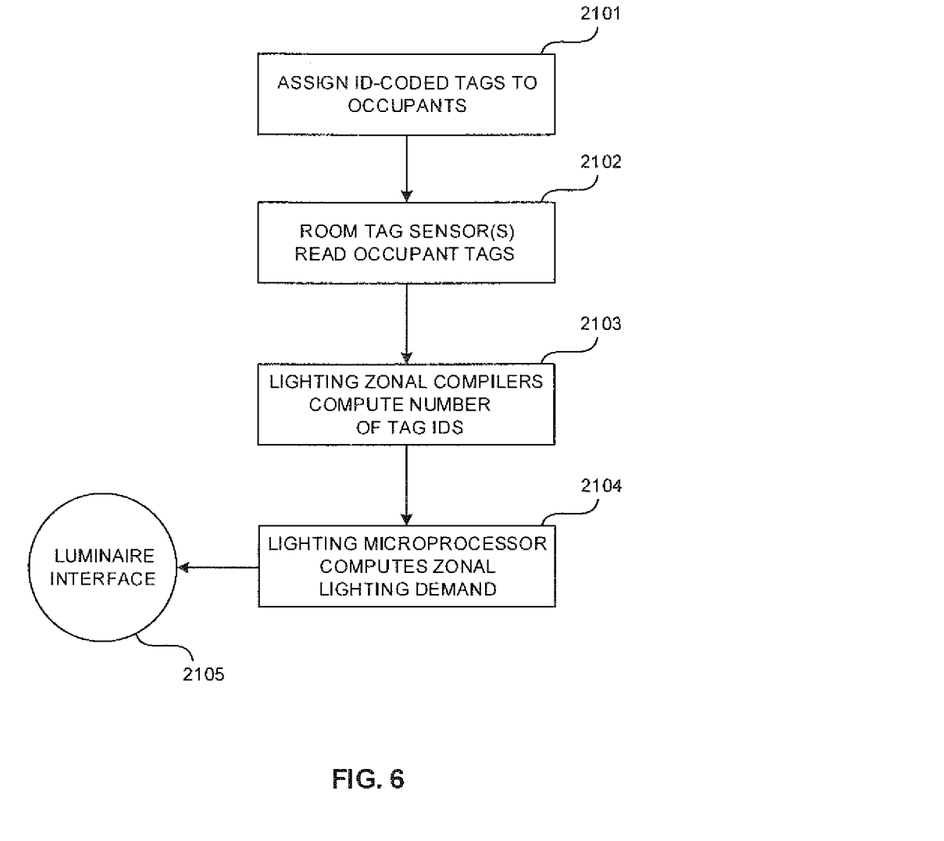
FIG. 6 is a block diagram illustrating the process of the tag embodiment of the present invention

Averting to FIG. 6 shown is a block diagram using lighting as the controllable utility and illustrating the relationship of the tag to the process of the invention. Other utility needs may also be controlled such as but not limited to HVAC, water, and other building utilities. In block 2101 shown is assigning an ID coded tag to an occupant or visitor. The zone tag sensor or sensors in the room read the occupant tags as illustrated in block 2102. A zonal compiler receives tag ID code(s) from the tag sensor(s) as shown in block 2103 and computes or determines the zonal occupancy count and transmits the zonal occupancy count to a microprocessor, block 2104. The microprocessor 2104 computes or determines the zonal lighting demand and controls the luminaire or series of luminaires, or other utility needs such as but not limited to HVAC, water, and other building utilities. In block 2105 an interface relay, such and a luminaire interface for lighting, controls the specific utility. It is within the scope of the invention for the control of building utility to be one or more of electrical lighting, HVAC, ventilation, water pluming, security, and any combination thereof.

Figure 7:
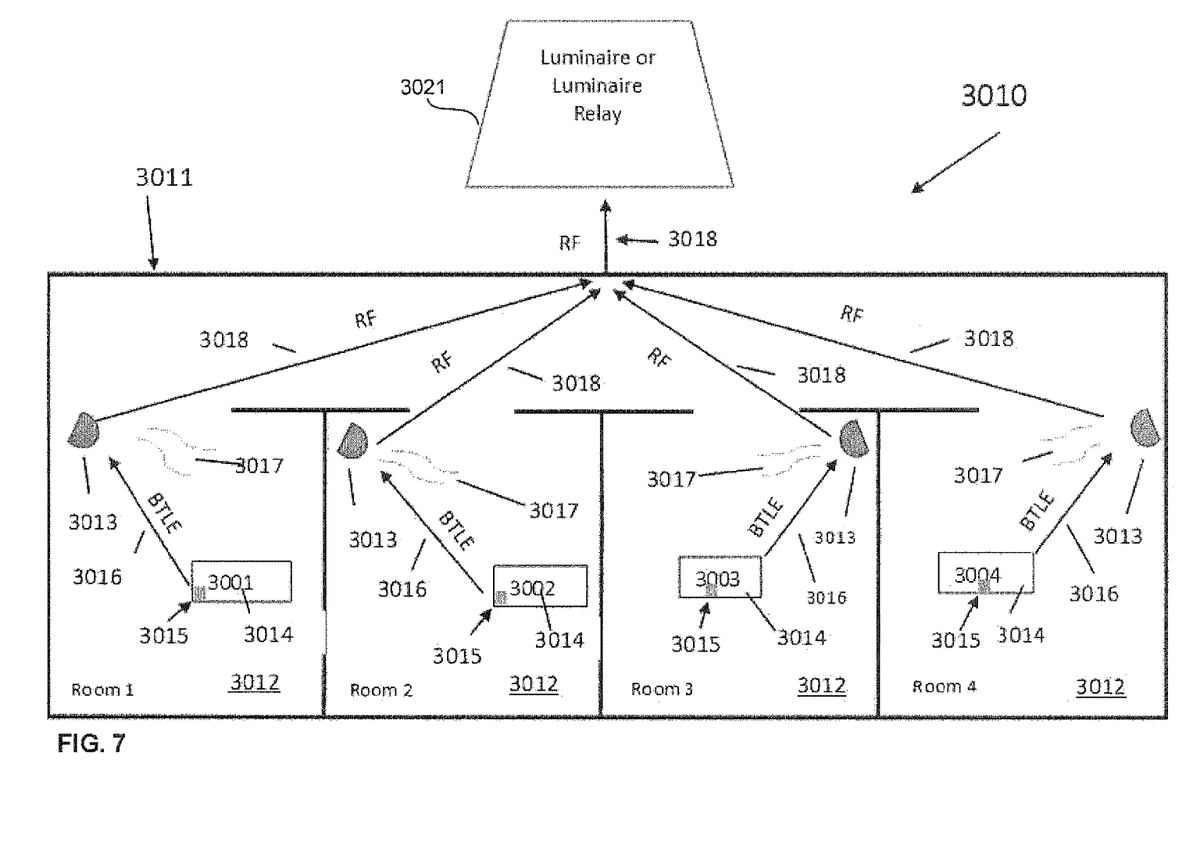
FIG. 7 is an illustration of utility control arrangement using the present invention without a zonal compiler.

FIG. 7 shows system 3010, without a complier and in a controlled zone 3011 there are tags 3015 attached to employee badges 3014. The tags 3015 emit radio frequency 3016, (such as, but not limited to, BLUETOOTH low energy, BTLE), to mounted sensors 3013 in each room 3012. In FIG. 7, in one embodiment the luminaire relay 3021 is a switch. If in another embodiment the sensor 3013 is the switch then 3021 is the luminaire or lighting itself. Again, as in the past embodiments the sensors may or may not be mounted. For example the sensor, as in the other illustrations and Figures, may be placed on a table, desk, or floor. In addition the sensor may be part of the light fixture itself. One sensor may control multiple light fixtures or there may be a sensor for each light fixture depending on the embodiment. Also there may be more than one sensor in each room depending on the embodiment. Sensor 3013 depending on the embodiment is enabled with a low energy radio frequency (RF) signal such as, but not limited to, BLUETOOTH-enabled and sensor 3013 will emit a search signal 3017 for any tags in its assigned space 3012. Sensors 3013 communicate wirelessly 3018 the location of tags 3015. In this embodiment there is no zonal compiler. The sensor 3013 communicates wirelessly 3018 with the lighting and/or HVAC microprocessor or switch or relay 3021. An optional embodiment is where the sensor 3013 is the switch for the lighting relay instead of using the microprocessor or switch 3021 to interface with the utility of interest and adjust or turn on/off the power to the utility such as the lighting and/or ventilation system.

Figure 8:
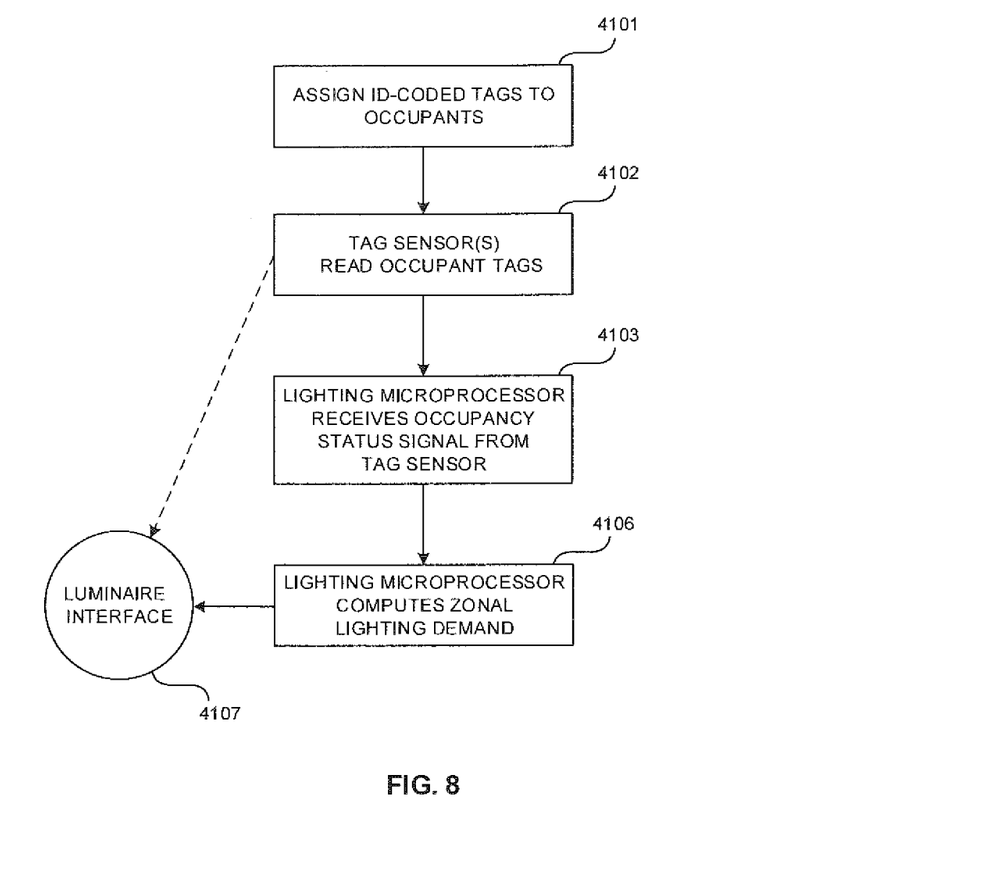
FIG. 8 is a block diagram illustrating the process of the tag embodiment of the present invention as shown in FIG. 7.

FIG. 8 shows the process without a complier. Illustrated is in block 4101 shown is assigning an ID coded tag to an occupant or visitor. Again, depending on the embodiment the tag or beacon may be carried, worn, or otherwise displayed by the occupant. The zone tag sensor or sensors in the room read the occupant tags as illustrated in block 4102. Depending on the embodiment, the sensor may send a signal directly to the switch, or a luminaire interface 4107 as shown in the illustration FIG. 8. Again the signal may be wireless as designated by the dashed hidden line in FIG. 8. A zonal compiler is not used in the process shown in FIG. 8. Alternatively the tag sensor reading in 4102 may communicate, wirelessly or otherwise, with a microprocessor 4103. In this embodiment microprocessor 4103 is a lighting microprocessor that receives occupancy status signal or signals from the tag sensor in block 4102 to block 4103. Further shown the microprocessor computes zonal lighting demands as in block 4106 and alternatively may control the luminaire interface or switch 4107. The microprocessor 4106 computes or determines the zonal lighting demand and controls the luminaire or series of luminaires, or other utility needs such as but not limited to HVAC, water, and other building utilities. In block 4107 an interface relay, such and a luminaire interface for lighting, controls the specific utility. However the interface may be with a ventilation, HVAC or other utility switch depending on the embodiment.

Although the embodiments of the present invention have been disclosed for illustrative purposes, those skilled in the art will appreciate that many additions, modifications and substitutions are possible, without departing from the scope and spirit of the present invention as defined by the accompanying claims.

What is claimed is:

1. A system for adjusting building utilities of a controlled zone within a building occupied by a plurality of occupants, the system comprising:
   a controlled zone having a service utility within a building, wherein each controlled zone includes a plurality of rooms;
   a plurality of tags or devices, wherein each tag or device of the plurality of tags or devices emits a signal and has a specific digital identification code assigned to a corresponding occupant that wears or carries the tag or device inside at least one room of the plurality of rooms;
   a first one or more sensors disposed in a first room in the controlled zone and emitting a search signal for any tags or devices in the first room for detecting a first subset of tags or devices of the plurality of tags or devices located in the first room during a time interval, and
   a second one or more sensors disposed in a second room in the controlled zone and emitting a search signal for any tags or devices in the second room for detecting a second subset of tags or devices of the plurality of tags or devices located in the second room during the time interval;
   a zonal compiler disposed in the controlled zone and wirelessly in communication with the first and second sensors; the zonal compiler configured to:
   communicate wirelessly with the first one or more sensors and the second one or more sensors, and with the first subset of tags or devices and the second subset of tags or devices to thereby wirelessly acquire a first group of digital identification (ID) codes corresponding to the first subset of tags or devices detected by the first one or more sensors during the time interval, and a second group of digital identification (ID) codes corresponding to the second subset of tags or devices detected by the second one or more sensors during the time interval;
   compare the first group of digital identification (ID) codes with the second group of digital ID codes;
   based on said comparison, identify a tag or device of the first subset of tags or devices as being the same as a tag or device of the second subset of tags or devices,
   eliminate the identified tag or device from the second group of digital identification (ID) codes to establish a corrected second group of digital identification (ID) codes, and
   determine a zonal occupancy count for the controlled zone and each room based on the acquired first group of digital identification (ID) codes and the corrected second group of digital identification (ID) codes; and
   a microprocessor that controls the service utility within the building, the microprocessor wirelessly interfaces with the first and second sensors, wherein the microprocessor immediately adjusts the service utility for each room in the controlled zone immediately upon entrance into or removal of the occupant wearing or carrying the tag or device from any room;
   wherein the microprocessor wirelessly interfaces through an interface relay with the zonal compiler to control the service utility, and the service utility is an electrical lighting.

2. The system according to claim 1, wherein the interface relay is a luminaire relay.

3. The system according to claim 1, wherein each room is individually controlled by the interface relay.

4. The system according to claim 3, wherein the lighting intensity is immediately adjusted to a visual comfort level according to the amount of occupants wearing or carrying the tags or devices in each room and the available ambient lighting.

5. The system according to claim 1, wherein the tags or device emit a radio frequency selected from the group consisting of RF low energy (BLUETOOTH), extremely low frequency RF 3-30 Hz, super low frequency RF 30-300 Hz, ultra low frequency RF 300-3000 HZ, microwave, and any combination thereof.

6. The system according to claim 1, wherein the interface relay that controls the service utility is controlled only by the presence or absence of the tag or device in the room, and not motion or sound of the occupant within the room.

7. The system according to claim 1, wherein an utility intensity is immediately adjusted to a comfort level according to an amount of occupants wearing or carrying the tags or devices in each room.

8. The system according to claim 1, wherein the service utility is a combination HVAC and the electrical lighting and the interface relay includes a luminaire relay.

9. The system according to claim 8, wherein each room is individually controlled and wherein each lighting fixture is individually controlled or jointly controlled as occupants enter and leave the room.

10. A system for adjusting building lighting within a controlled zone in a building occupied by a plurality of occupants, the system comprising:
    a controlled zone having a lighting service utility within a building, wherein each controlled zone includes a plurality of rooms;
    a plurality of tags or devices worn or carried by a plurality of occupants, wherein one tag or device is with one occupant and the tags or devices emit a signal with a specific digital identification (ID) code assigned to a corresponding occupant having the tag or device;
    a first sensor disposed in a first room in the controlled zone, the first sensor emitting a search signal for any tags or devices in the first room for detecting a first subset of tags or devices of the plurality of tags or devices located in the first room during a time interval, and
    a second sensor disposed in a second room in the controlled zone, the second sensor emitting a search signal for any tags or devices in the second room for detecting a second subset of tags or devices of the plurality of tags or devices located in the second room during the time interval;
    a zonal compiler disposed in the controlled zone and wirelessly in communication with the first and second sensors; the zonal compiler configured to:
    communicate wirelessly with the first one or more sensors and the second one or more sensors, and with the first subset of tags or devices and the second subset of tags or devices to thereby wirelessly acquire a first group of digital identification (ID) codes corresponding to the first subset of tags or devices detected by the first one or more sensors during the time interval, and a second group of digital identification (ID) codes corresponding to the second subset of tags or devices detected by the second one or more sensors during the time interval;
    compare the first group of digital identification (ID) codes with the second group of digital ID codes;

based on said comparison, identify a tag or device of the first subset of tags or devices as being the same as a tag or device of the second subset of tags or devices, eliminate the identified tag or device from the second group of digital identification (ID) codes to establish a corrected second group of digital identification (ID) codes, and determine a zonal occupancy count for the controlled zone and each room based on the acquired first group of digital identification (ID) codes and the corrected second group of digital identification (ID) codes; and wherein a microprocessor wirelessly interfaces through an interface relay with the zonal compiler to control the lighting service utility;

and wherein the lighting service utility for each room in the controlled zone is immediately adjusted upon entrance into or removal of the occupant having the tag or device from any room.

11. The system according to claim 10, wherein the microprocessor wirelessly interfaces with the first and second sensors.

12. The system according to claim 11, whereby the interface relay controls the lighting service utility within the building, and the interface relay wirelessly interfaces with the microprocessor and the first and second sensors, and the interface relay immediately adjusts the lighting service utility for each room in the controlled zone immediately upon entrance into or removal of the occupant having the tag or device from any room, and each room is individually controlled by the interface relay.

13. The system according to claim 10, wherein the one sensor is mounted and the tags or devices are worn or carried by the occupants and each room has only one sensor.

14. The system according to claim 10, wherein a lighting intensity is immediately adjusted to a comfort and an energy saving level according to an amount of occupants wearing or carrying the tags or devices in each room and amount of available ambient light already in the room.

15. A process for adjusting building service utilities of a controlled zone within a building occupied by a plurality of occupants, the process comprising the following steps:

assigning a tag or device to each occupant of the plurality of occupants, each tag or device having a specific digital identification (ID) code related to the occupant;

placing in the controlled zone at least a first sensor and a second sensor;

prompting initiation of wireless communications during a time interval between the first sensor and a first subset of tags or devices located in a first room, and between the second sensor and a second subset of tags or devices located in a second room;

providing an interface relay that controls the service utility within the building, the interface relay wirelessly interfaces with a microprocessor, wherein the interface relay immediately adjusts the service utility based on the occupancy for each room in the controlled zone immediately upon entrance into or removal of the occupant wearing or carrying the tag or device from any room;

placing a zonal compiler assigned to controlled zone and wirelessly communicating with the first sensor and the second sensor, and the first subset of tags or devices and the second subset of tags or devices to acquire a first group of digital identification (ID) codes corresponding to the first subset of tags or devices detected by the first sensor during the time interval, and a second group of digital identification (ID) codes corresponding to the second subset of tags or devices detected by the second sensor during the time interval, the zonal compiler configured to:

compare the first group of digital identification (ID) codes with the second group of digital identification (ID) codes, identify any tag or device of the first subset of tags or devices as being the same as one in the second subset of tags or devices, wherein an identified tag or device moved between the first room and the second room during the time interval, eliminate the identified tag or device from the second group of digital identification (ID) codes to establish a corrected second group of digital identification (ID) codes, and determine a zonal occupancy count for the zone based on the acquired first group of digital identification (ID) codes and the corrected second group of digital identification (ID) codes;

determine a zonal utility rate based on the zonal occupancy count and a floor area of the controlled zone; and wherein the service utility is an electrical lighting.

16. The process according to claim 15, wherein the interface relay is a luminaire relay.

17. The processes according to claim 15, wherein the service utility is a combination HVAC and the electrical lighting and the interface relay includes a luminaire relay.

* * * * *